United States Patent
Malone et al.

(10) Patent No.: US 6,910,692 B2
(45) Date of Patent: Jun. 28, 2005

(54) COMPOSITE ELASTOMERIC SEAL FOR SEALING FLUID LINES

(75) Inventors: Carol Malone, Marstons Mills, MA (US); Donald Maher, New Bedford, MA (US)

(73) Assignee: Precix, Inc., New Bedford, MA (US)

(*) Notice: Subject to any disclaimer, the term of this patent is extended or adjusted under 35 U.S.C. 154(b) by 0 days.

(21) Appl. No.: 10/392,623

(22) Filed: Mar. 20, 2003

(65) Prior Publication Data

US 2003/0230855 A1 Dec. 18, 2003

(Under 37 CFR 1.47)

Related U.S. Application Data

(60) Provisional application No. 60/366,295, filed on Mar. 20, 2002.

(51) Int. Cl.[7] .............................................. F16J 15/32
(52) U.S. Cl. ..................... 277/556; 277/530; 277/566; 277/589; 277/647; 277/934
(58) Field of Search ................................. 277/556, 553, 277/584, 589, 530, 626, 647, 649, 934, 566

(56) References Cited

U.S. PATENT DOCUMENTS

| | | | |
|---|---|---|---|
| 2,284,340 A | * 5/1942 | Nuckles | 277/438 |
| 2,512,883 A | * 6/1950 | Warren | 285/112 |
| 2,565,923 A | * 8/1951 | Hrdlicka, Jr. | 277/346 |
| 3,104,884 A | * 9/1963 | Kerlin | 277/566 |
| 3,342,500 A | 9/1967 | Knudson | |
| 3,603,603 A | 9/1971 | Woodson | |
| 3,608,913 A | * 9/1971 | D'Assignies | 277/556 |
| 3,653,672 A | 4/1972 | Felt | |
| 3,751,048 A | * 8/1973 | Rode | 277/649 |
| 3,851,888 A | 12/1974 | Liimpson, Jr. et al. | |
| 3,885,801 A | 5/1975 | Scannell | |
| 4,013,299 A | 3/1977 | Scott | |
| 4,103,909 A | * 8/1978 | Hoffman et al. | 277/520 |
| 4,141,563 A | 2/1979 | Wu | |
| 4,174,846 A | 11/1979 | Scott | |
| 4,193,606 A | 3/1980 | Iverson | |
| 4,328,972 A | 5/1982 | Albertson et al. | |
| 4,410,189 A | * 10/1983 | Myers et al. | 277/530 |
| 4,443,019 A | * 4/1984 | Ishido et al. | 277/652 |
| 4,602,888 A | * 7/1986 | Court et al. | 403/28 |
| 4,618,154 A | 10/1986 | Freudenthal | |
| 4,687,212 A | 8/1987 | Timpson, Jr. et al. | |
| 4,706,970 A | * 11/1987 | Ramirez | 277/556 |
| 4,723,782 A | 2/1988 | Muller | |
| 4,741,541 A | * 5/1988 | Franken | 277/359 |
| 5,265,890 A | 11/1993 | Balsells | |
| 5,269,537 A | 12/1993 | Kiesel | |
| 5,354,072 A | * 10/1994 | Nicholson | 277/647 |
| 5,472,216 A | 12/1995 | Albertson et al. | |
| 6,007,070 A | * 12/1999 | Heathcott et al. | 277/510 |
| 6,161,834 A | * 12/2000 | Pollack et al. | 277/300 |

* cited by examiner

Primary Examiner—Alison K. Pickard
(74) Attorney, Agent, or Firm—Barlow, Josephs & Holmes, Ltd.

(57) ABSTRACT

A composite elastomeric seal for sealing fluid line members is provided. The composite seal comprises an outer U-shaped seal body and an inner elastomeric portion. The U-shaped seal body comprises inner and outer extending arms, each arm having a shaped contour and two protruding lip portions. One set of lips of the outer seal wraps around the inner elastomeric portion, and the other set of lips provides an auxiliary seal for sealing the fluid line members together. The invention further includes sealing assemblies that employ the composite seals.

11 Claims, 3 Drawing Sheets

COMPOSITE ELASTOMERIC SEAL FOR SEALING FLUID LINES

CROSS-REFERENCE TO RELATED APPLICATIONS

This application claims the benefit of U.S. Provisional Application No. 60/366,295 having a filing date of Mar. 20, 2002.

BACKGROUND OF THE INVENTION

The present invention relates generally to sealing rings for sealing machinery lines together. More particularly, the present invention relates to an improved "U-shaped" composite elastomeric seal for sealing together fluid line members such as fuel injection lines and fuel ports.

The industry uses sealing rings and gaskets in various applications for sealing fluid lines such as gas lines, chemical lines, hydraulic cylinders, and the like. For example, "O-rings" are commonly used in fluid sealing systems. Particularly, conventional sealing systems can comprise three components: a) an O-ring made from a fluorocarbon material; b) a metal spacer; and c) an O-ring made from a fluorosilicone material.

A conventional three-part sealing system using O-rings and a metal spacer is shown in FIG. 1 herein. In FIG. 1, the pressurized fluid is shown as flowing from the left side of the sealing system as indicated by the direction of the arrow. The fluorocarbon O-ring is located on the fluid-facing side of the sealing assembly, i.e., on the side where the fluid approaches the assembly. The fluorocarbon O-ring provides good chemical and fluid resistance. The fluorosilicone O-ring is located on the opposite side of the sealing assembly and provides good temperature resistance. The secondary, fluorosilicone O-ring acts as a secondary seal in the event that the primary, fluorocarbon O-ring seal should malfunction. In this manner, the sealing system provides a double-sealing effect. In general, conventional three-part sealing assemblies provide an effective seal; however, there are several disadvantages associated with such systems. For example, the costs of such assemblies are relatively high, since three separate and distinct components must be installed in a specific configuration. In addition, these systems are typically assembled by force-fitting the components together. The industry would prefer a sealing system that does not require such high insertion forces. Further, O-rings are prone to rolling during installation of the rings. Rolling of the O-rings can cause spiral failures during operation of the seal.

In addition, the industry employs U-shaped and other configured seals for sealing machinery lines. For example, Scott, U.S. Pat. No. 4,013,299 discloses an annular sealing ring comprising a U-cup having a pair of lips for forming a cavity therebetween and an elastomeric expander ring mounted within the cavity. The sealing edges are positioned on the outside of the lips at a vertical location at or below the horizontal center line of the expander ring. No compression forces are applied to the sealing edges above the horizontal centerline of the expander ring.

Wu, U.S. Pat. No. 4,141,563 discloses a lip-type shaft seal for rotary or reciprocating shafts. The patent describes the seal element as being made of an elastomer and having a C-shape cross-section. The toroidal cavity of the seal element is filled with a ring of an elastomeric material, such as silicone rubber adhesive sealant, which prevents collapse of the seal under high internal pressure. The inside of the C-shaped seal also includes a garter spring which provides a constricting force.

Timpson, Jr. et al., U.S. Pat. No. 4,687,212 discloses an annular sealing ring with a generally Y-shaped cross-section for sealing between a piston and the curved wall of a cylinder. The sealing ring includes a base with one or more horizontal ribs extending outwardly from each side thereof an pair of lips with sealing edges. The lips are spaced apart to form a cavity therebetween. An elastic, expander ring is sealed in a portion of the cavity so that a void is created in the cavity below the expander ring.

Muller, U.S. Pat. No. 4,723,782 discloses a sealing structure comprising a sealing ring having a groove. A rubber-elastic stressing O-ring is fitted in the groove at a certain initial tension. The elastic stressing ring urges one area of the sealing ring against a face of the groove in a sealing relationship while simultaneously pressing the sealing edges of the sealing ring, arranged axially one behind the other, against the shaft to be sealed off.

Kiesel, U.S. Pat. No. 5,269,537 discloses a composite radial seal for sealing the rod end of a hydraulic cylinder or suspension strut. The seal includes a high abrasion-resistant elastomeric seal ring having a U-cup configuration with an elongated body. The body has a pressure end and non-pressure end. The seal further includes a highly resilient energizer ring which is filled and sealed within the cavity of the U-cup seal ring, and an integral anti-extrusion ring which is carried on the non-pressure end of the U-cup seal ring.

In view of the foregoing problems with conventional sealing systems, it would be desirable to have an improved composite elastomeric seal. The composite seal should be an integrated structure comprising an elastomeric portion and a harder, more chemically resistant portion. Such a composite seal could be used to replace conventional three-part sealing systems as described above. Further, the composite seal should have a shaped contour so that it can provide a tighter seal at the interface where the line members are coupled together. The present invention provides such a composite elastomeric seal. The present invention further provides a sealing assembly comprising two fluid line members coupled and sealed together using the composite elastomeric seal of this invention.

SUMMARY OF THE INVENTION

The present invention relates to composite elastomeric seals for sealing fluid line members and sealing assemblies that employ such seals. The composite seal comprises an outer U-shaped seal body. The U-shaped body comprises a first (inner) extending arm and a second (outer) extending arm with a groove or cup-like cavity extending between the arms. The inner extending arm has a contour which curves inwardly so that a first sealing lip is located at the proximal end of the arm, and a second sealing lip is located at the distal end of the arm. Likewise, the outer extending arm has a contour which curves inwardly so that a first sealing lip is located at the proximal end of the arm, and a second sealing lip is located at the distal end of the arm. The central segment of the outer seal body, which connects the two extending arms, also has a concavely curved portion The first lips at the proximal ends of the extending arms are auxiliary sealing lips that form a tightly sealing surface along the connecting fluid line members. The composite seal further comprises an inner elastomeric seal which is located within the groove of the outer seal body. The inner elastomeric seal is relatively soft and flexible and can have a substantially round cross-section. The second sealing lips at the distal ends of the extending arms partially encapsulate the inner elastomeric seal. These primary sealing lips engage the inner seal to form a tightly sealed surface where the fluid line members are connected.

The present invention further includes a sealing assembly comprising two connected fluid line members. At least one of the line members has an upper surface containing a flanged section (shoulder abutment) and a lower surface containing a flanged section. The above-described composite elastomeric seal of this invention is used for sealing the connected line members. The assembly further includes two composite elastomeric seals. The flanged sections of the line member are shaped to receive the first (auxiliary) lips protruding from the proximal ends of the inner and outer extending arms of the U-shaped outer seal bodies.

Among the objects of the present invention are: providing a composite seal having an integrated structure comprising a softer, elastomeric portion and a harder, more chemically and abrasion-resistant portion;

providing a composite seal having a shaped contour with protruding lip sealing portions for effectively sealing two fluid line members together; and providing a sealing assembly comprising two connected fluid line members that are sealed together using the composite seal of this invention.

Other objects, features, and advantages of the invention shall become apparent as the description thereof proceeds when considered in connection with the accompanying illustrative drawings.

BRIEF DESCRIPTION OF THE DRAWINGS

The novel features characteristic of the present invention are set forth in the appended claims. However, the preferred embodiments of the invention, together with further objects and attendant advantages, are best understood by reference to the following detailed description taken in connection with the accompanying drawings in which:

DETAILED DESCRIPTION OF THE PREFERRED EMBODIMENTS

Figure 1:
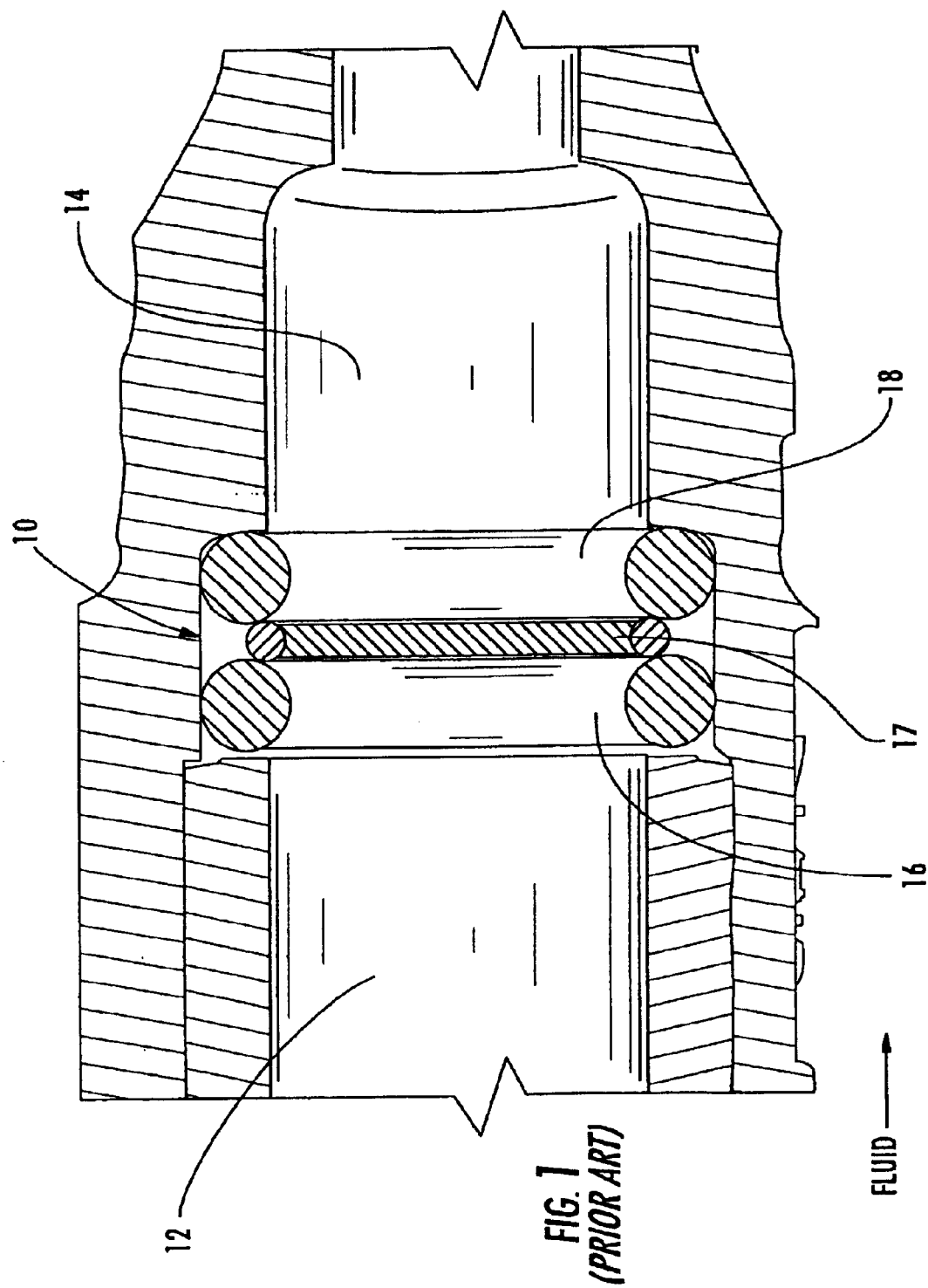
FIG. 1 is a longitudinal cross-sectional view of a prior art three-part sealing system for sealing two fluid line members together.

Referring to FIG. 1, a three-part sealing system of the prior art is generally indicated at 10. The sealing system 10 is used for sealing line members 12 and 14 which are coupled together. The sealing system 10 comprises O-rings 16 and 18 and a metal spacer 17. The O-ring 16 is typically made of a fluorocarbon material and positioned on the fluid-facing side of the sealing system 10. (In FIG. 1, the pressurized fluid is shown as flowing from the left side of the sealing assembly 10 as indicated by the direction of the arrow.) The O-ring 18 is located on the opposite side of the sealing system 10 and is typically made of a fluorosilicone material. These prior art sealing systems 10 provide a double-sealing effect. The secondary, fluorosilicone O-ring seal 18 acts as a secondary seal in the event that the primary, fluorocarbon O-ring seal 16 malfunctions. However, as discussed above, these prior art sealing systems 10 have several disadvantageous features including cost and installation problems.

Figure 2:
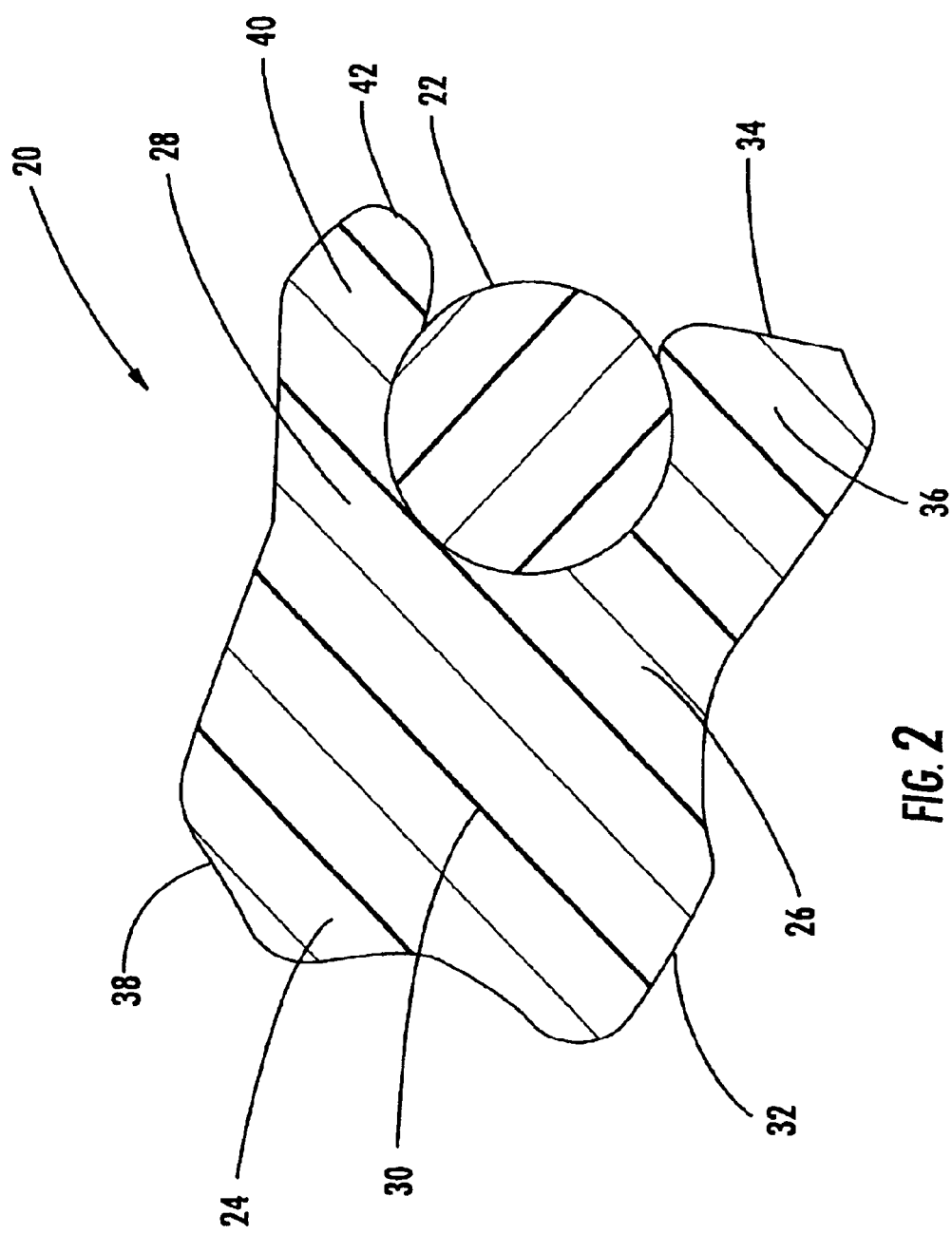
FIG. 2 is a cross-sectional view of the composite elastomeric seal of the present invention.

The present invention provides an improved sealing system over conventional sealing systems. In FIG. 2, the composite elastomeric seal of the present invention is illustrated and generally indicated at 20. As more fully described below, the instant composite seal 20 includes an inner elastomeric seal generally indicated at 22 and an outer U-shaped seal body generally indicated at 24.

Figure 3:
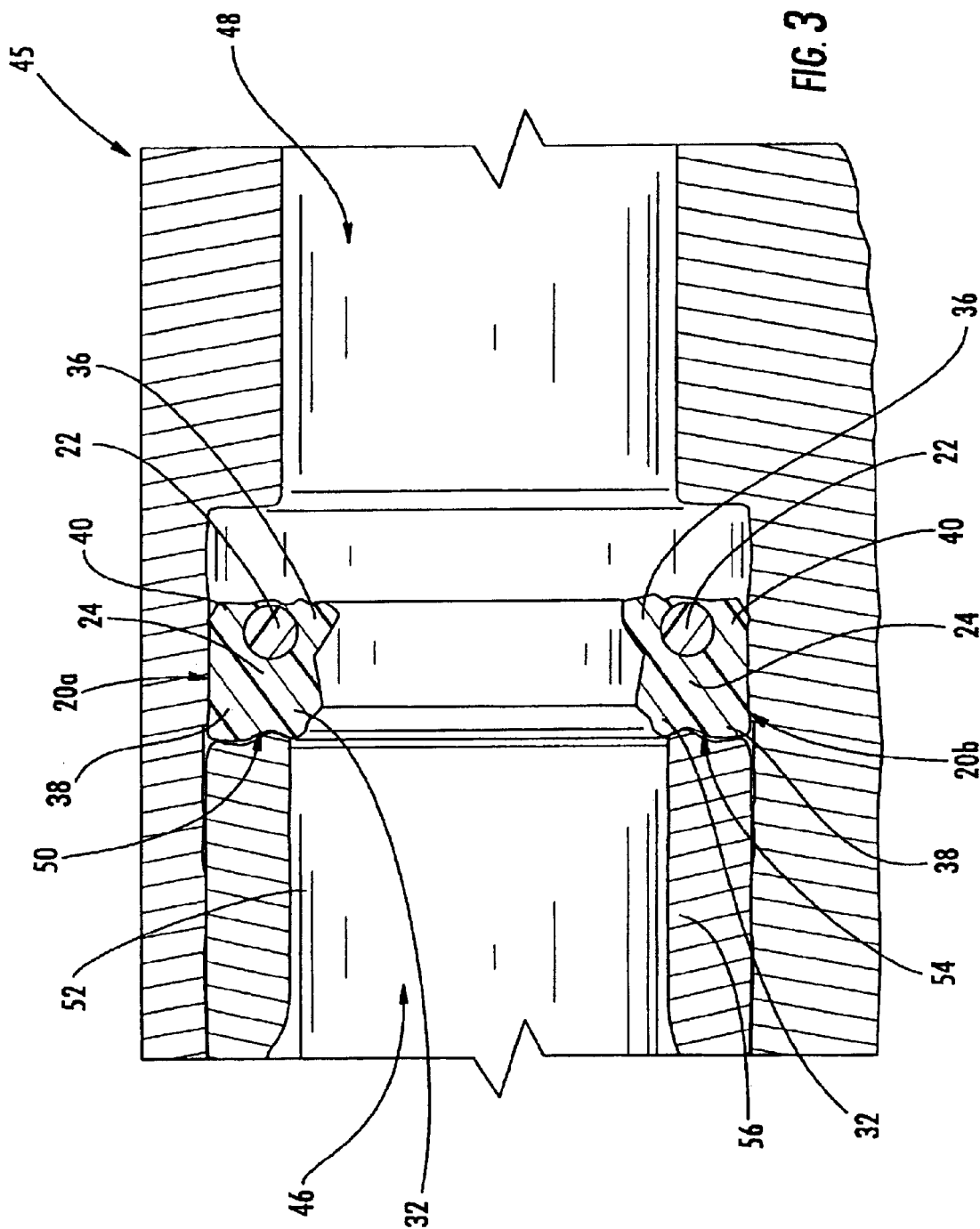
FIG. 3 is a longitudinal cross-sectional view of the composite elastomeric seal of the present invention for sealing two fluid line members together.

The U-shaped outer seal body 24 comprises a first (inner) extending arm 26 and a second (outer) extending arm 28 that are connected by a central segment 30. The inner and outer extending arms 26 and 28 define a groove or cup-like cavity between the arms 26 and 28. The inner seal 22 is located and sealed within the groove of the outer seal body 24. In FIGS. 2 and 3, the inner seal 22 is shown as having a substantially round cross-section. Other cross-sectional structures may be suitable provided that the inner seal 22 can fill and seal the groove between the extending arms 26 and 28.

The outer seal body 24 comprises three distinctively contoured segments. First, the inner extending arm 26 curves inwardly so that a first protruding lip portion 32 is located at its proximal end, and a second lip portion 36 is located at its distal end. The first lip 32, which is located at the proximal end of the inner extending arm 26, is an auxiliary lip that forms a tightly sealed surface at the flanged sections of the connected fluid line members (not shown). This sealing interface is further discussed below. In FIG. 2, the second lip 36 at the distal end of the inner extending arm 26 is shown as having a substantially flat edge 34. The second lip 36 is a primary sealing lip that wraps around the inner elastomeric seal 22. The second lip 36 engages the inner seal 22 to form a tightly sealed surface at the interface of the coupled fluid line members as further discussed below.

In addition, the outer seal body 24 includes a central segment 30 which connects the inner and outer extending arms 26 and 28. This central segment 30 contains a concavely curved portion.

Further, the outer extending arm 28 has a slightly concave segment so that a first protruding lip portion 38 is located at its proximal end, and a second lip portion 40 is located at its distal end. The first lip 38, which is located at the proximal end of the outer extending arm 28, is an auxiliary lip that forms a tightly sealed surface at the flanged sections of the connected fluid line members (not shown). In FIG. 2, the second lip 40 at the distal end of the outer extending arm 28 is shown as having a substantially rounded edge 42. The second lip 40 is a primary sealing lip which wraps around the inner seal 22. The second lip 40 engages the inner seal 22 to form a tightly sealed surface at the sealing interface of the coupled line members as further discussed below.

As shown in FIG. 2, the primary sealing lips 36 and 40 partially encapsulate inner seal 22. The connected fluid line members cause the primary sealing lips 36 and 40 of the U-shaped outer seal body 24 to contract so that the lips 36 and 40 rotate into the inner seal 22 and deform the seal 22. The inner seal 22 is made from a relatively soft, elastomeric material so that it substantially returns to its original shape when deformed. The inner elastomeric seal 22 exerts an outwardly directed force which resists the inwardly directed force of the lips 36 and 40 of the outer seal 24. The kinetic energy of the initially displaced inner seal 22 serves to energize the sealing lips 36 and 40 of the outer seal 24 so that the lips 36 and 40 are pressed into engagement with the connecting fluid line members to be sealed.

Further, the elastomeric inner seal 22 generally does not have good chemical or abrasion resistance; thus, the inner seal 22 tends to swell and expand. As the inner seal 22 swells, it further exerts pressure forces on the lips 36 and 40 of the outer seal 24 so that the seal 24 expand towards and seals the connecting fluid line members.

Suitable elastomers that may be used to form the inner seal 22 include, for example, styrene-butadiene copolymers, polychloroprene, nitrile rubbers, polysulfide rubbers, ethylene-propylene terpolymers, polysiloxane (silicone) rubbers, and fluoroelastomers such as fluorosilicones. For example a fluorosilicone rubber material available from Precix, Inc. (New Bedford, Mass.) under Compound Number 13443 can be used.

The U-shaped outer seal body 24 can be made from a relatively tough material such as fluorocarbon polymers, for example, polytetrafluoroethylene (PTFE), polyurethanes; polyesters; nylons; or thermoplastics having high chemical and abrasion resistance properties. The materials for the outer seal body 24 are relatively harder materials and have less resiliency than the materials used to fabricate the inner seal 22. For example a fluorocarbon material available from Precix, Inc. (New Bedford, Mass.) under Compound Number 13730 can be used to fabricate the outer seal 24.

Referring to FIG. 3, the present invention further includes a sealing assembly generally indicated at 45. The sealing assembly 45 comprises two connecting fluid line members 46 and 48. (In FIG. 3, the pressurized fluid is shown as flowing from the left side of the sealing assembly 45 as indicated by the direction of the arrow.) The composite elastomeric seal 20 of this invention, as described above, is located between the two line members 46 and 48. In FIG. 3, the assembly 45 is shown as having two composite seals 20a and 20b. Single or multiple composite seals 20 may be used in accordance with the present invention. In FIG. 3, the composite seals 20a and 20b act to tightly seal the coupled line members 46 and 48 and prevent fluid escaping from the lines.

Referring to the coupled line members 46 and 48, one line member 46 contains a flanged section (shoulder abutment) 50 on its upper surface 52 and a flanged section 54 on its lower surface 56. Referring now to the upper composite elastomeric seal 20a, the flanged member 50 is shaped to receive the first (auxiliary) lips 32 and 38 protruding from the proximal ends of the inner and outer extending arms 26 and 28 of the U-shaped outer seal 24. In a similar manner, for lower composite elastomeric seal 20b, the flanged portion 54 on the lower surface 56 of line member 46 is shaped to receive the first (auxiliary) lips 32 and 38 protruding from the proximal ends of the inner and outer extending arms 26 and 28 of the outer seal 24.

The first (auxiliary) lips 32 and 38 of each respective composite seal 20a and 20b provide a tightly sealed surface to prevent fluid from escaping from that area where the line members 46 and 48 are coupled together. The second (primary) sealing lips 36 and 40 of each respective composite seal 20a and 20b partially encapsulate the inner elastomeric seal 22 and rotate into the seal 22 to provide tight sealing surfaces as described above.

An FEA analysis of the composite seal was conducted. The results showed adequate sealing forces at the sealing lips and a reduced insertion force. The analysis was also conducted at minimum, nominal, and maximum void conditions to evaluate stresses, strains, and sealing under various conditions; the sealing effect was satisfactory in each instance. The composite elastomeric seal of the present invention provides a good sealing effect and can be used in various applications such as in the sealing of fluid line members. For example, the composite seal can be used for sealing gas injection lines that are coupled to gas ports. The fluid line members, which are sealed together in accordance with this invention, can be used for providing fuel, chemicals, hydraulic fluid, and the like.

While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A composite elastomeric seal, comprising:
  (i) an outer U-shaped seal body, the body comprising a first extending arm and a second extending arm that defines a groove therebetween, the first extending arm having a contour which curves inwardly so that a first sealing lip is located at the proximal end of the arm, and a second sealing lip is located at the distal end of the arm, and the second extending arm having a contour which curves inwardly so that a first sealing lip is located at the proximal end of the arm, and a second sealing lip is located at the distal end of the arm; and
  (ii) an inner elastomeric seal located within the groove of the outer seal body, wherein the inner elastomeric seal swells upon exposure to a fluid causing the inner elastomeric seal to exert pressure upon the second sealing lips of the first and second extending arms of the outer U-shaped seal body.

2. The composite elastomeric seal of claim 1, wherein the U-shaped seal body comprises a material selected from the group consisting of fluoropolymers, polyurethanes, polyesters, and nylons.

3. The composite elastomeric seal of claim 2, wherein the U-shaped seal body comprises a fluoropolymer.

4. The composite elastomeric seal of claim 1, wherein the inner seal comprises an elastomer selected from the group consisting of styrene-butadiene copolymers, polychloroprene, nitrile rubbers, polysulfide rubbers, ethylene-propylene terpolymers, polysiloxane rubbers, and fluoroelastomers.

5. The composite elastomer seal of claim 4, wherein the inner seal comprises a fluoroelastomer.

6. The composite elastomer seal of claim 5, wherein the fluoroelastomer is a fluorosilicone.

7. The composite elastomeric seal of claim 1, wherein the inner elastomeric seal has a substantially round cross-section.

8. A sealing assembly, comprising:
 (i) two connected fluid line members, wherein at least one of the line members includes an upper surface having a flanged section and a lower surface having a flanged section; and
 (ii) two composite elastomeric seals for sealing the connected line members, each seal comprising:
  (a) an outer U-shaped seal body, the body comprising a first extending arm and a second extending arm that defines a groove therebetween, the first extending arm having a contour which curves inwardly so that a first sealing lip is located at the proximal end of the arm, and a second sealing lip is located at the distal end of the arm, and the second extending arm having a contour which curves inwardly so that a first sealing lip is located at the proximal end of the arm, and a second sealing lip is located at the distal end of the arm; and
  (b) an inner elastomeric seal located within the groove of the outer seal body,
 wherein the flanged sections of the fluid liner member are shaped to receive the first sealing lips of the U-shaped outer seals, and the inner elastomeric seal swells upon exposure to a fluid causing the inner elastomeric seal to exert pressure upon the second sealing lips of the first and second extending arms of the outer U-shaped seal body which forces the second sealing lips into engagement with the fluid line members.

9. The sealing assembly of claim 8, wherein one fluid line member is a gas injection line and the other fluid line member is a gas port.

10. The sealing assembly of claim 8, whereby the first sealing lips of the composite seals provide an auxiliary sealing of the fluid line members.

11. The sealing assembly of claim 8, whereby the second sealing lips of the composite seals rotate into the inner elastomeric seal and provide a primary sealing of the fluid line members.

* * * * *